US010263326B2

(12) United States Patent
Singh et al.

(10) Patent No.: US 10,263,326 B2
(45) Date of Patent: Apr. 16, 2019

(54) REPEATER WITH MULTIMODE ANTENNA

(71) Applicant: ETHERTRONICS, INC., San Diego, CA (US)

(72) Inventors: Abhishek Singh, San Diego, CA (US); Sebastian Rowson, San Diego, CA (US); Laurent Desclos, San Diego, CA (US); Jeffrey Shamblin, San Marcos, CA (US)

(73) Assignee: ETHERTRONICS, INC., San Diego, CA (US)

( * ) Notice: Subject to any disclaimer, the term of this patent is extended or adjusted under 35 U.S.C. 154(b) by 0 days.

(21) Appl. No.: 15/917,101

(22) Filed: Mar. 9, 2018

(65) Prior Publication Data

US 2018/0198200 A1 Jul. 12, 2018

Related U.S. Application Data

(63) Continuation of application No. 15/242,514, filed on Aug. 20, 2016, now Pat. No. 9,917,359, which is a continuation-in-part of application No. 14/965,881, filed on Dec. 10, 2015, now Pat. No. 9,748,637, which is a continuation-in-part of application No. 14/144,461, filed on Dec. 30, 2013, now Pat. No. 9,240,634, which is a continuation of application No. 13/726,477, filed on Dec. 24, 2012, now Pat. No. 8,648,755, which is a continuation of application No. 13/029,564, filed on Feb. 17, 2011, now Pat. No. 8,362,962, which is a continuation of application No. 12/043,090, filed on Mar. 5, 2008, now Pat. No. 7,911,402.

(51) Int. Cl.

| | |
|---|---|
| ***H01Q 1/52*** | (2006.01) |
| ***H01Q 9/04*** | (2006.01) |
| ***H04B 7/15*** | (2006.01) |
| ***H04W 52/52*** | (2009.01) |
| ***H01Q 1/24*** | (2006.01) |
| ***H01Q 3/00*** | (2006.01) |

(52) U.S. Cl.

CPC ............ *H01Q 1/521* (2013.01); *H01Q 1/243* (2013.01); *H01Q 3/00* (2013.01); *H01Q 9/0421* (2013.01)

(58) Field of Classification Search

CPC ............ H01Q 1/243; H01Q 1/38; H01Q 1/52; H01Q 1/521; H01Q 3/00; H01Q 21/22; H01Q 3/34; H01Q 9/0421; H04B 7/15; H04B 7/155; H04B 1/5571; H04W 52/52

See application file for complete search history.

(56) References Cited

U.S. PATENT DOCUMENTS

| | | | |
|---|---|---|---|
| 2,236,102 | A | 3/1941 | Kilster |
| 2,318,516 | A | 5/1943 | Newbold |
| 2,433,804 | A | 12/1947 | Wolff |
| 2,761,134 | A | 8/1956 | Tewsbury et al. |
| 2,938,208 | A | 5/1960 | Engel et al. |
| 3,419,869 | A | 12/1968 | Altmayer |
| 3,971,031 | A | 7/1976 | Burke |
| 5,165,109 | A | 11/1992 | Han et al. |

(Continued)

*Primary Examiner* — Tho G Phan

(74) *Attorney, Agent, or Firm* — Dority & Manning, P.A.

(57) ABSTRACT

The disclosure concerns an antenna subsystem that can be used in various repeater systems to optimize gain of the repeater by increasing isolation between donor and server antennas, wherein at least one of the donor and server antennas is an active multi-mode antenna.

4 Claims, 5 Drawing Sheets

(56) References Cited

U.S. PATENT DOCUMENTS

| | | | | |
|---|---|---|---|---|
| 5,235,343 | A | 8/1993 | Audren | |
| 5,485,167 | A | 1/1996 | Wong et al. | |
| 5,568,155 | A | 10/1996 | Tsunekawa | |
| 5,598,169 | A | 1/1997 | Drabeck | |
| 5,777,581 | A | 7/1998 | Lilly et al. | |
| 5,784,032 | A | 7/1998 | Johnston et al. | |
| 5,874,919 | A | 2/1999 | Rawnick | |
| 5,943,016 | A | 8/1999 | Snyder et al. | |
| 5,999,138 | A | 12/1999 | Ponce de Leon | |
| 6,104,349 | A | 8/2000 | Cohen | |
| 6,326,921 | B1 | 12/2001 | Egorov | |
| 6,342,869 | B1 | 1/2002 | Edvardsson et al. | |
| 6,384,792 | B2 | 5/2002 | Apostolos | |
| 6,429,818 | B1 | 8/2002 | Johnson et al. | |
| 6,614,400 | B2 | 9/2003 | Egorov | |
| 6,717,549 | B2 | 4/2004 | Rawnick et al. | |
| 6,734,825 | B1 | 5/2004 | Guo et al. | |
| 6,765,536 | B2 | 7/2004 | Phillips | |
| 6,903,686 | B2 | 6/2005 | Vance et al. | |
| 6,987,493 | B2 | 1/2006 | Chen | |
| 7,068,234 | B2 | 6/2006 | Sievenpiper | |
| 7,081,854 | B2 | 7/2006 | Ying et al. | |
| 7,132,989 | B1 | 11/2006 | Poilasne | |
| 7,180,464 | B2 | 2/2007 | Chiang et al. | |
| 7,215,289 | B2 | 5/2007 | Harano | |
| 7,265,720 | B1 | 9/2007 | Ponce De Leon et al. | |
| 7,265,724 | B1 | 11/2007 | Tan et al. | |
| 7,330,156 | B2 | 2/2008 | Arkko et al. | |
| 7,333,057 | B2 | 2/2008 | Snyder | |
| 7,525,504 | B1 | 4/2009 | Song | |
| 7,616,163 | B2 | 11/2009 | Montgomery | |
| 7,619,574 | B1 | 11/2009 | West | |
| 7,696,928 | B2 | 4/2010 | Rowell | |
| 7,830,320 | B2 | 11/2010 | Shamblin et al. | |
| 7,834,813 | B2 | 11/2010 | Caimi | |
| 7,847,740 | B2 | 12/2010 | Dunn et al. | |
| 7,903,034 | B2 | 3/2011 | Anguera et al. | |
| 7,911,402 | B2 | 3/2011 | Rowson et al. | |
| 7,999,746 | B2 | 8/2011 | Cho | |
| 8,320,849 | B2 | 11/2012 | Nogami et al. | |
| 8,354,967 | B2 | 1/2013 | Huynh | |
| 8,446,318 | B2 | 5/2013 | Warden | |
| 8,581,789 | B2 | 11/2013 | Desclos | |
| 8,604,988 | B2 | 12/2013 | Desclos et al. | |
| 8,934,398 | B2 * | 1/2015 | Gaal | H04B 7/155<br>370/315 |
| 9,231,669 | B2 | 1/2016 | Desclos | |
| 9,439,151 | B2 | 9/2016 | Zhu et al. | |
| 9,742,060 | B2 * | 8/2017 | Walker | H01Q 1/38 |
| 9,793,974 | B2 * | 10/2017 | Lotter | H04B 7/15571 |
| 2004/0027286 | A1 | 2/2004 | Poilasne | |
| 2004/0207559 | A1 | 10/2004 | Milosavljevic | |
| 2004/0227667 | A1 | 11/2004 | Sievenpiper | |
| 2005/0192727 | A1 | 9/2005 | Shostak | |
| 2005/0275596 | A1 | 12/2005 | Harano | |
| 2005/0285541 | A1 | 12/2005 | LeChevalier | |
| 2006/0220966 | A1 | 10/2006 | Sarychev | |
| 2007/0069958 | A1 | 3/2007 | Ozker | |
| 2007/0176824 | A1 | 8/2007 | Stumbo | |
| 2008/0001829 | A1 | 1/2008 | Rahola | |
| 2013/0040651 | A1 | 2/2013 | Derneryd et al. | |
| 2013/0143483 | A1 * | 6/2013 | Gore | H04B 7/2606<br>455/7 |
| 2013/0183895 | A1 * | 7/2013 | Gore | H04B 7/0404<br>455/7 |

* cited by examiner

Two-element array on donor and server side

Multi-mode antennas at donor and server (example yields 16 combinations of antenna patterns)

Varying antenna polarization

Multi-sector antenna

REPEATER WITH MULTIMODE ANTENNA

CROSS-REFERENCE TO RELATED APPLICATIONS

This application is a continuation (CON) of U.S. Ser. No. 15/242,514, filed Aug. 20, 2016;

which is a continuation in part (CIP) of U.S. Ser. No. 14/965,881, filed Dec. 10, 2015;

which is a CIP of U.S. Ser. No. 14/144,461, filed Dec. 30, 2013, now U.S. Pat. No. 9,240,634;

which is a CON of U.S. Ser. No. 13/726,477, filed Dec. 24, 2012, now U.S. Pat. No. 8,648,755;

which is a CON of U.S. Ser. No. 13/029,564, filed Feb. 17, 2011, now U.S. Pat. No. 8,362,962;

which is a CON of U.S. Ser. No. 12/043,090, filed Mar. 5, 2008, now U.S. Pat. No. 7,911,402;

the contents of each of which are hereby incorporated by reference.

BACKGROUND

The present disclosure concerns an antenna subsystem that can be used in various repeater systems to optimize gain of the repeater by increasing isolation between donor and server antennas.

Typically, repeater products maximize isolation between the donor and server antennas through the use of highly directive antennas that point away from each other. However, with multiband antennas that cover broad frequency ranges (e.g. from 700 MHz to 2.1 GHz), the size of such highly directive antennas prohibits such an arrangement. In a three-hop repeater, the separation between the donor and server antennas helps to increase this isolation. However, normally directional antennas are used even in three hop repeaters to improve isolation and maximize system gain.

US Pub. 2012/0015608, published Jan. 19, 2012, herein "the '608 pub", describes a method in a wireless repeater employing an antenna array for interference reduction; the contents of which are hereby incorporated by reference. In the '608 pub., it is suggested that one or both of the donor and server antennas may comprise a multi-antenna array, and further, that the antenna arrays can be sampled and processed to identify and condition the repeater system to relay an optimized version of an incoming signal received. One problem with the '608 pub is a volume required of the repeater system to house the multi-antenna array(s).

SUMMARY

Disclosed is an antenna subsystem that can be used in various repeater systems to optimize gain of the repeater by increasing isolation between donor and server antennas.

In some implementations, an antenna system for optimizing gain of a repeater is provided. The antenna system may include a donor antenna sub-system, a server antenna sub-system, and a processor to determine an optimal configuration for the antenna system. The donor antenna sub-system may accept an incoming signal. The server antenna sub-system may be configured to relay an optimized version of the incoming signal. The processor may be a processor to determine an optimal configuration for the antenna system for generating the optimized version of the incoming signal, in which the optimal configuration is based on an optimal value of a cost function of operating the donor antenna sub-system and/or the server antenna sub-system in each of one or more operational configurations. The cost function may be based on one or more operational inputs.

The following features may be included in the antenna system in any suitable combination. The one or more operation inputs in the antenna system may include transmitter power of the donor antenna sub-system and/or the server antenna sub-system. The one or more operational inputs may include receiver power of the donor antenna sub-system and/or the server antenna sub-system. The one or more operational inputs may include at least one of a signal-to-noise ratio of the donor antenna sub-system and a signal-to-noise ratio of the server antenna sub-system. The one or more operational inputs may include at least one of the one or more operational configurations. In some implementations of the antenna system, each of the donor antenna sub-system and the server antenna subsystem may provide a radiation pattern that is orthogonal to each other. In some such implementations, an orthogonality of the radiation pattern may be dynamically changed by the processor according to the configuration. In implementations in which the radiation may be dynamically changed, the radiation pattern may be changed by a change in a pattern of radiation of a signal of one or both of the donor antenna sub-system and the server antenna subsystem. The radiation pattern may be changed by a change in a null position of one or both of the donor antenna sub-system and the server antenna sub-system. The radiation pattern may be changed by a change in a polarization of one or both of the donor antenna sub-system and the server antenna subsystem. The radiation pattern may be changed by a change in a physical orientation of one or both of the donor antenna sub-system and the server antenna subsystem.

In a related aspect, a method of optimizing gain of an antenna system of a repeater may be provided in some implementations. The method may include tuning, by a measuring system, to an operating frequency of a donor antenna sub-system of the antenna system, the donor antenna sub-system being configured to accept an incoming signal; tuning, by the measuring system, to an operating frequency of a server antenna subs-system of the antenna system, the server antenna sub-system being configured to relay an optimized version of the incoming signal; measuring, by the measuring system, one or more operational inputs from the operation of the donor antenna sub-system and/or server antenna sub-system at the operating frequency; calculating, by a processor and based on the one or more operational inputs, an output of a cost function of each of one or more operational configurations of the donor antenna sub-system and/or server antenna sub-system; and determining, by the processor, an optimal configuration for the antenna system for generating the optimized version of the incoming signal based on an optimal cost function output.

The following features may be included in the method of optimizing gain of an antenna system of a repeater in any suitable combination. The one or more operational inputs may include transmitter power of the donor antenna sub-system and/or the server antenna sub-system. The one or more operational inputs may include receiver power of the donor antenna sub-system and/or the server antenna sub-system. The one or more operational inputs may include at least one of a signal-to-noise ratio of the donor antenna sub-system and a signal-to-noise ratio of the server antenna sub-system. In some implementations, the method may further include providing a radiation pattern from each of the donor antenna sub-system and the server antenna subsystem, in which the radiation patterns are orthogonal to each other. In some such implementations, the method may further include changing, by the processor, an orthogonality of the radiation pattern in a dynamic manner, according to the optimal configuration for the antenna system. Further, in some such implementations, the method may include changing, by the processor, the radiation pattern according to a change in a pattern of radiation of a signal of one or both of the donor antenna sub-system and the server antenna subsystem. The method may include changing, by the processor, the radiation pattern according to a change in a null position of one or both of the donor antenna sub-system and the server antenna subsystem. Some implementations may include changing, by the processor, the radiation pattern according to a change in a polarization of one or both of the donor antenna sub-system and the server antenna sub system.

In order to achieve small form and improved isolation, one or both of the donor and server antennas may individually comprise an active multimode antenna (or "modal antenna"). The ability of the modal antenna to form one or multiple nulls while generating a wide beam width radiation pattern makes this antenna type an optimal candidate for a server antenna tasked to illuminate in-building regions where multiple users in a multipath environment are located.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations.

In the drawings.

When practical, similar reference numbers denote similar structures, features, or elements.

DETAILED DESCRIPTION

In some implementations, a system and method utilizes omni-directional antennas at both the donor and server sides. Increased isolation is obtained by using additional degrees of freedom in the antenna design to maximize isolation. For example, in some implementations, at the donor side, a system uses a vertically polarized omni-directional antenna. Additionally or alternately, at the server side, the system can deploy two antennas, one with vertical polarization and one with horizontal polarization. The system can then automatically determine which of the polarizations will yield the biggest isolation and therefore the best system gain.

The degrees of freedom that can be utilized are not limited to polarization. Other orthogonal options may be used as well. For example, the donor and server antennas could each have multiple orthogonal beam patterns such as the beam patterns that can be achieved using a circular array antenna. The system could then search through all the combinations of donor and server antenna patterns to find the one that will yield the biggest isolation between donor and server and therefore the highest system gain.

In addition to the isolation, other cost functions may also be used to optimize the antennas used. For example, a cost function to maximize the output power level at the server antenna can be used. In this case, the cost function will take into account the isolation between the donor and server antennas as well as the signal strength of a particular base station. The optimization may be performed in two stages, where the donor antenna subsystem is first optimized to provide the strongest input signal level and then the server antenna is optimized to achieve maximum isolation. The combination of maximum isolation plus maximum input signal could yield the highest output power at the server antenna. Alternatively, the input signal level and isolation may be jointly optimized to achieve the same effect. As an alternative to isolation and server antenna output power, the system may use a cost function that optimizes the signal-to-noise ratio of the signal at the output of the server antenna. In this case, the donor antenna sub-system will include a cost function that will adapt the antennas to null out interfering base stations. This action will improve the signal to noise ratio of the donor signal. The server antenna can then be adapted to optimize the isolation to provide maximum coverage of the best quality donor signal from the server antenna. In this type of cost function implementation the active multimode antenna ("modal antenna") provides an optimal antenna solution where radiation modes are selected for the donor antenna to maximize signal strength from a desired base station or SINR to minimize interference from other base stations while the radiation modes of the modal antenna used for the server antenna can be selected to optimize isolation between donor and server antennas.

Figure 1:
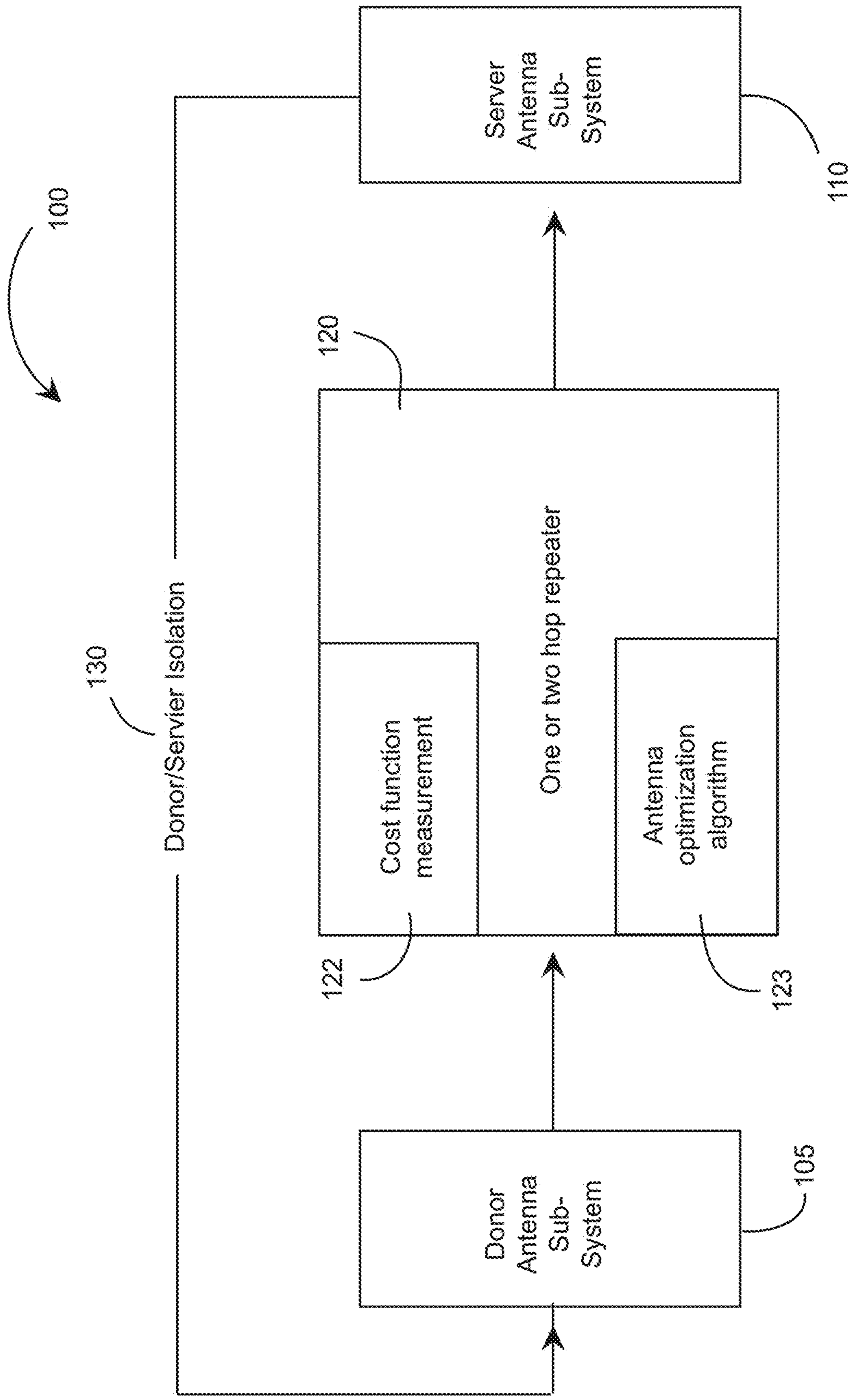
FIG. 1 is a schematic of an exemplary system for an antenna subsystem for optimizing gain in a repeater in a multi-hop repeater system.

FIG. 1 shows a schematic of a basic system for an antenna sub-system for optimizing gain in a repeater in a multi-hop repeater system 100.

In one specific embodiment in a three-hop repeater, the Donor Antenna Sub-system 105 consists of four vertically polarized omni-directional antennas, each being tuned to a specific frequency of operation. The Server Antenna Sub-system 110 consists of two dual-band antennas, tuned to the same frequencies as the Donor antennas 105, but with horizontal and vertical polarization. During operation, the repeater 120 will measure the isolation between the donor and server 130 for the two different server antenna polarizations (cost function 122) and then direct a processor to run an algorithm to maximize the isolation between the donor and server antenna sub-systems (Antenna optimization algorithm 123) which will return the optimal gain for the system.

Figure 2:
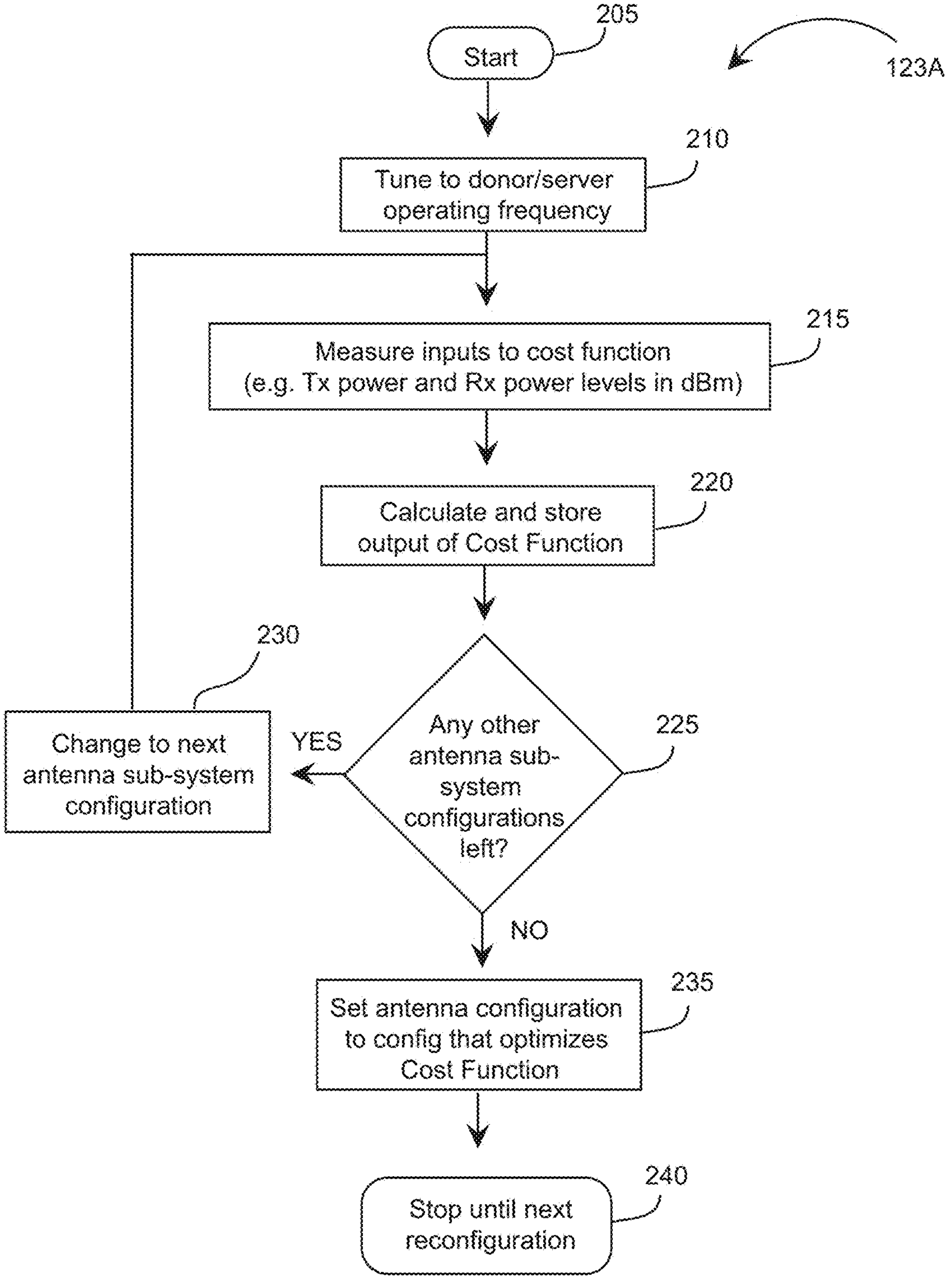
FIG. 2 is a flow diagram of an exemplary antenna optimization algorithm for optimizing gain in the system of FIG. 1.

FIG. 2 is a flow diagram of an exemplary antenna optimization method 123A for optimizing gain in the system of FIG. 1, as executed by a processor. The method 123A in FIG. 2 accepts a start state, as in 205, and iterates through antenna sub-system configurations until a configuration that optimizes the cost function is found. From the initial, or start, state 205, the method 123A tunes to the donor or server antenna's operating frequency, as in 210. From there, the repeater (120 in FIG. 1) measures the inputs to the cost function, and the method 123A receives those input values, as in 215. The inputs to the cost function may include the transmitting and receiving power levels, such as in dBm. The method 123A then calculates and stores the output of the cost function, as in 220. After a number of iterations, the output values of the cost function are compared. During each iteration, the processor that executes the method 123A may be associated with one or more memory components where the cost function outputs (and optionally the input values) may be stored.

After storing the cost function output for a given set of inputs, the processor determines, according to an algorithm, whether or not there are any further antenna sub-systems for which the cost function calculation must be run, as in 225. The system has more than one configuration, and the algorithm will proceed to calculate the cost function for each configuration until cost function outputs have been calculated for all configurations. Accordingly, if the processor executing the method 123A has not yet exhausted all antenna sub-system configurations, the processor executing the method 123A will cause the system to change to the next antenna sub-system configuration, as in 230. The processor executing the method 123A will then receive the measured inputs to the cost function, as in 215; calculate and store the output of the cost function, as in 220; and once again determine whether any further antenna sub-system configurations need to be evaluated for their cost function values, as in 225.

Once the processor executing the method 123A has evaluated all antenna sub-system configurations, the cost function outputs stored in memory are compared, the configuration that best optimizes the cost function is selected, and then the system is directed to set the antenna sub-systems to the configuration that corresponds to the best optimized cost function output values, as in 235. The processor executing the method does not start another iteration of the method until a user or other portion of the system reconfigures one or both antenna sub-systems or a portion of the system that would alter the cost function outputs, as in 240.

Figure 3:
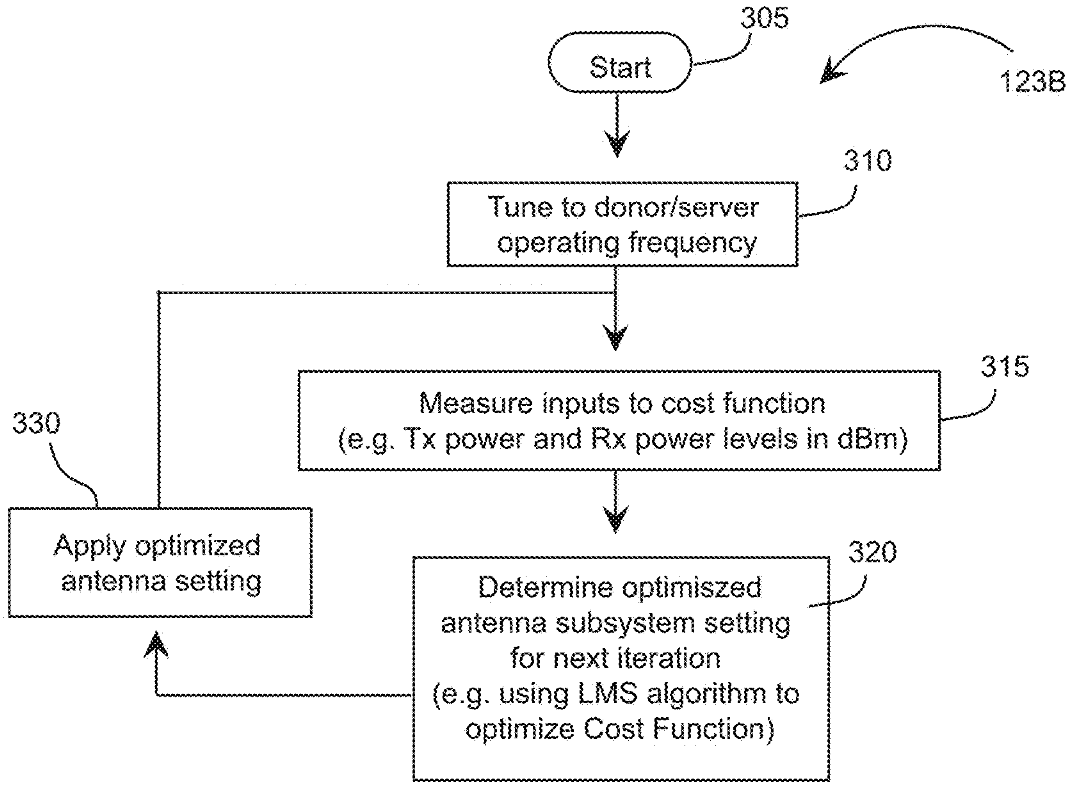
FIG. 3 is a flow diagram of another exemplary antenna optimization algorithm for optimization gain in the system of FIG. 1.

FIG. 3 is a flow diagram of another exemplary antenna optimization method 123B for optimizing gain in the system of FIG. 1. The method 123B in FIG. 3 begins with an initial configuration of the donor and server antenna sub-systems, as in 305, and continually optimizes the cost function calculation by altering the antenna sub-system configurations. From the initial, or start, state 305, the method 123B includes tuning the donor or server antenna's operating frequency, as in 310. From there, the inputs to the cost function are measured, and those input values, as in 315, are received by a processor executing the method. The inputs to the cost function may include the transmitting and receiving power levels, for example in dBm. The optimized antenna sub-system settings are determined based upon an optimization of the cost function, as in 320. The antenna sub-system configuration that optimizes the cost function is passed along and applied to cause the antenna sub-systems to conform to the optimized configuration, as in 330. The gain, based upon the initial values of components of the system, is also optimized with the cost function.

This newly optimized system is used as the starting point for the next iteration of the method 123B. Once again, the inputs to the cost function are received, as in 315, and further changes to the antenna sub-system configuration are determined that will optimize the output from the cost function, as in 320. These changes are applied, as in 330, and the next iteration begins. The one or more configurations are iterated through. When no changes to the antenna sub-systems configuration can be determined that will further optimize the cost function at 320, then no changes are applied in 330. However, should the system be changed, such as by a user or a part of the system that is not influenced by the method 123B, then a new start or initial state 305 is defined and the method 123B progresses as described above. In this way, the method 123B is always optimizing the cost function, and thus finding the configuration of the system that optimizes system gain.

FIG. 4A-FIG. 4D are schematics showing various exemplary donor antenna (105A, 105B, 105C, 105D) and server antenna (110A, 110B, 110C, 110D) sub-systems for use with a system for optimizing gain.

Figure 4A:
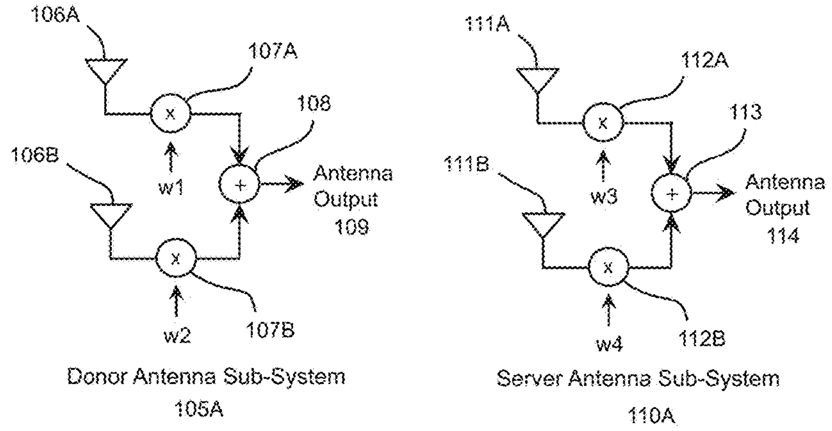
FIG. 4A-FIG. 4D are schematics showing various exemplary donor and server antenna sub-systems for use with a system for optimizing gain, such as the system shown in FIG. 1.

FIG. 4A shows a schematic displaying a donor antenna sub-system 105A and a server antenna sub-system 110A in which the physical orientation and null position of the antenna sub-system components can be varied. In the donor antenna sub-system 105A, there can be two or more antenna elements 106A and 106B. These antenna elements 106A and 106B may have different physical orientations with respect to each other. In the case where there are more than two antenna elements, there may be a pattern to the difference in orientation between any two adjacent antenna elements. Conversely, when more than two antenna elements are present, there may be no distinct pattern to the difference in orientation between any two adjacent antenna elements. Each antenna element 106A, 106B may receive a signal that is passed through a weighting coefficient multiplier, 107A, 107B, respectively. The weight assigned to each signal can be optimized to achieve the best output from the cost function (i.e. the best gain for the system). The weighted signals can then be passed to a summing unit 108 that then passes along a composite signal as the donor antenna sub-system output 109 to the rest of the system.

Similarly, in FIG. 4A, the server antenna sub-system 110A can have there can be two or more antenna elements 111A and 111B. These antenna elements 111A and 111B may have different physical orientations with respect to each other. In the case where there are more than two antenna elements, there may be a pattern to the difference in orientation between any two adjacent antenna elements. Conversely, when more than two antenna elements are present, there may be no distinct pattern to the difference in orientation between any two adjacent antenna elements. Each antenna element 111A, 111B may receive a signal that is passed through a weighting coefficient multiplier, 112A, 112B, respectively. The weight assigned to each signal can be optimized to achieve the best output from the cost function, and in turn the optimal gain from the system. The weighted signals can then be passed to a summing unit 113 that then passes along a composite signal as the server antenna sub-system output 114.

Figure 4B:
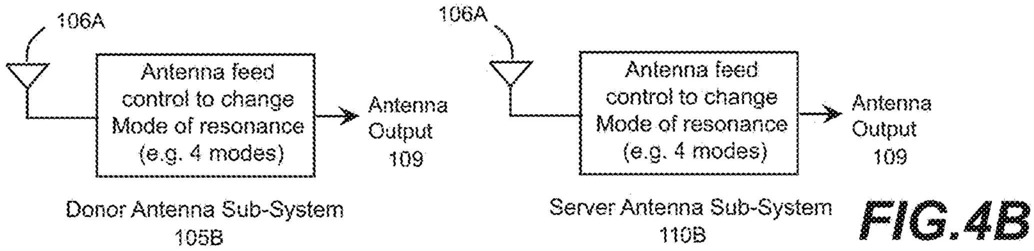

FIG. 4B shows a schematic displaying a donor antenna sub-system 105B and a server antenna sub-system 110B in which the mode or pattern of the antenna sub-system components can be varied. The donor antenna sub-system 105B can have one or more antenna elements 106A that accept an incoming signal that can be processed by more than one mode of resonance. In FIG. 4B, the signal is shown to have four modes that the system can switch between to find an optimal setting on the donor antenna sub-system. After the signal is modified by a mode, it is passed to the rest of the system as the donor antenna sub-system output 109. The server antenna sub-system 110B has a similar configuration with one or more antenna elements 111A, multiple modes to select from, and a server antenna sub-system output 114. A mode that optimizes the performance of the system can be selected from the multiple modes of the server antenna sub-system 110B. The total number of possible combinations depends on the number of possible modes at both the donor antenna sub-system 105B and the server antenna sub-system 110B. The product of the number of modes at each sub-system yields the total number of possible combinations that can be iterated through to find the overall configuration that optimizes the cost function, and thus the gain of the system.

In furtherance of the embodiments described in FIG. 4B, and in order to achieve small form and improved isolation, including up to several more degrees of freedom for adjusting isolation between the donor and server antennas, one or both of the donor and server antennas may individually comprise an active multimode antenna (or "modal antenna").

Figure 5:
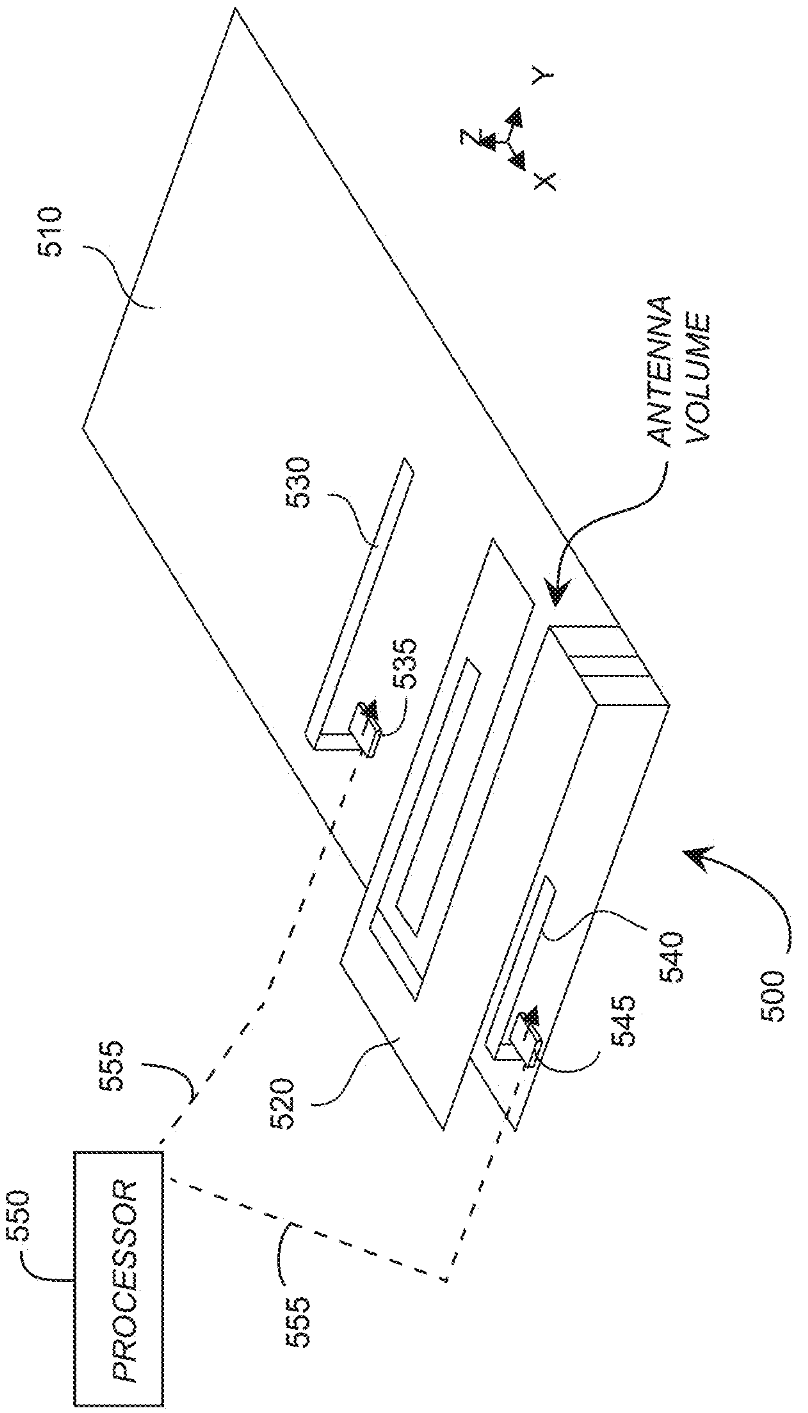
FIG. 5 shows an example of an active multimode antenna in accordance with one embodiment.

Now, with reference to FIG. 5, which shows an exemplary structure of an active multimode antenna 500 in accordance with one embodiment, the active multimode antenna 500 comprises: a radiating element 520 positioned above a circuit board 510 forming an antenna volume therebetween; one or more parasitic conductor elements 530; 540 (or "parasitic elements"); and one or more active components 535; 545 coupled to the one or more parasitic elements for controlling a state thereof. The one or more active components 535; 545 may comprise a tunable capacitor, tunable inductor, switch, tunable phase shifter or other active controlled component known by those having skill in the art, or a circuit including a combination thereof. The one or more active components 535; 545 are further coupled to a processor 550 and control lines 555 for receiving control signals configured to adjust a reactive loading of the respective active components, and thereby change a state associated with the parasitic elements coupled therewith. In each state of the combination of parasitic elements and active components, the active multi-mode antenna is configured to produce a corresponding radiation pattern or "mode", such that the multimode antenna is configurable about a plurality of possible antenna modes, wherein the multimode antenna provides a distinct radiation pattern in each of the plurality of possible modes. In this regard, the multimode antenna can be implemented in a repeater system in place of an antenna array, thereby providing smaller form. In addition, the multimode antenna can achieve many more antenna modes than an antenna array, and more precise discrete variations in the corresponding antenna radiation patterns. More specifically, the radiating element can be configured with one or more nulls (signal minima) in the radiation pattern, and the combination of parasitic elements and active components can be used to steer the radiation pattern such that the null is directed in a desired direction. As such, the degree to which isolation may be fine-tuned is much improved with the use of a multi-mode antenna when compared to the conventional technique of implementing an array of antennas, since, the multimode antenna provides additional degrees of freedom for steering the radiation pattern and nulls associated therewith. The multimode antenna provides the capability of generating and steering a null for isolation improvement between pairs of antennas while maintaining a lower directivity (i.e. wider beamwidth) radiation pattern compared to traditional array techniques where multiple antennas are used to generate an array pattern. Thus, smaller form and improved isolation is achieved with the implementation of a multimode antenna system in the repeater.

It will be understood by those having skill in the art that the active multimode antenna illustrated in FIG. 5 is capable of changing frequency resonance(s) ("band switching"); changing a vector of signal maxima in the radiation pattern ("beam steering"); changing a vector direction of signal minima ("null steering"); and changing a direction of polarization of the antenna radiation pattern.

Whereas conventional techniques utilizes two or more antennas with different polarizations and switching between them, the active multimode antenna of FIG. 5 can be implemented with tunable active components, such as variable capacitors and the like, for incrementally inducing a change in the corresponding radiation pattern of the active multimode antenna, resulting in more degrees of freedom when compared to the conventional embodiments.

Moreover, while FIG. 5 shows one embodiment of an active multimode antenna, other embodiments can be similarly implemented. Details of certain variations are described in each of the related documents as incorporated by reference herein, and may be further appreciated upon a thorough review of the contents thereof.

Figure 4C:
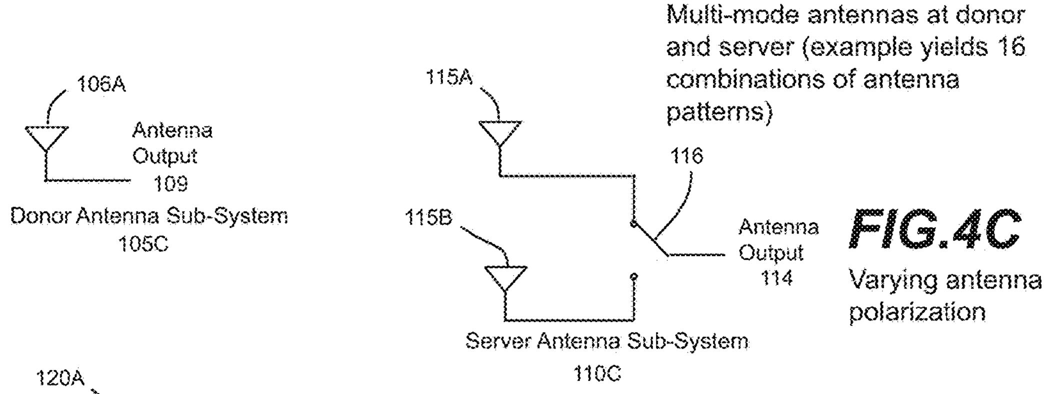

FIG. 4C shows a schematic displaying a donor antenna sub-system 105C and a server antenna sub-system 110C in which the polarization of the antenna sub-system components can be varied. The donor antenna sub-system 105C has at least one antenna element 106A that sends the received signal along to the rest of the system as the donor antenna sub-system output 109 without any modification. The server antenna sub-system 110C has two or more antenna elements with different polarization. In FIG. 4C, the server antenna sub-system 110C antenna elements include an antenna element with horizontal polarization 115A and an antenna element with vertical polarization 115B. The output from each antenna element leads to a switch 116. The processor executing the method can cause the server antenna sub-system switch 116 to toggle between the different polarizations 115A and 115B while the cost function is calculated for each configuration. Once the configuration is found that optimizes the cost function, the switch is toggled to the appropriate position, and the resulting signal is the output 114 from the server antenna sub-system.

Figure 4D:
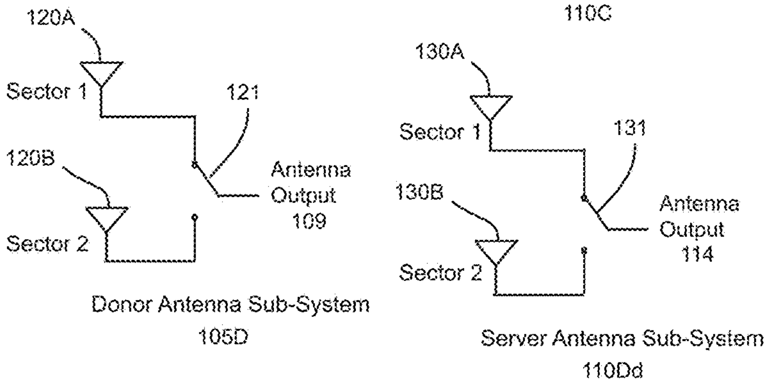

FIG. 4D shows a schematic displaying a donor antenna sub-system 105D and a server antenna sub-system 110D in which the sectors of the antenna sub-system components can be varied. The donor antenna sub-system 105D has one or more antenna elements 120A and 120B that may send the received signal along to the rest of the system as the donor antenna sub-system output 109 without any modification. A switch 121 may be used to toggle between the donor antenna elements 120A and 120B. The server antenna sub-system 110D has two or more antenna elements with different sectors 130A and 130B. In FIG. 4D, the server antenna sub-system 110D includes a switch 131 for toggling between the different server antenna elements 130A and 30B. The processor executing the method can cause the donor antenna sub-system switch to toggle between the different sectors, each associated with an antenna element 120A and 120B, as well as causing the server antenna sub-system switch to toggle between the different sectors, each associated with an antenna element 130A and 130B, while the cost function is calculated for each configuration. Once the configuration is found that optimizes the cost function, the switches 121 and/or 131 may be toggled to the appropriate position, and the resulting signal is the output 114 from the server antenna sub-system. The number of sectors and/or antenna elements at each antenna sub-system may differ. For example, each antenna sub-system may have two sectors. Alternatively, the donor antenna sub-system may have two sectors and the server antenna sub-system may have more than two sectors, or vice-versa.

A system (100 in FIG. 1), can employ of the combinations of donor and server antenna sub-systems described above. In some implementations, a system can include more than one of the combinations of donor and server antenna sub-systems described above.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, methods of use, embodiments, and combinations thereof are also possible. Therefore the spirit and scope of the appended claims should not be limited to the description of the embodiments contained herein.

What is claimed is:

1. An antenna system for optimizing gain of a repeater, comprising:

a donor antenna sub-system that accepts an incoming signal;

a server antenna sub-system configured to relay an optimized version of the incoming signal;

a processor configured to determine an optimal configuration for the antenna system for generating the optimized version of the incoming signal, the optimal configuration being based on an optimal value of a cost function of operating the donor antenna sub-system and/or the server antenna sub-system in each of one or more operational configurations, the cost function being based on one or more operational inputs;

characterized in that:

the donor antenna sub-system comprising a multi-mode antenna adapted for configuration in one of a plurality of possible antenna modes, the multi-mode antenna exhibiting a distinct radiation pattern when configured in each of the antenna modes;

wherein the optimal configuration for the antenna system is achieved by configuring the multi-mode antenna in the one of the plurality of possible modes.

2. The antenna system of claim 1, wherein the server antenna sub-system comprises a second multi-mode antenna adapted for configuration in one of a plurality of possible second antenna modes, the second multi-mode antenna exhibiting a distinct radiation pattern when configured in each of the second antenna modes; wherein the optimal configuration for the antenna system is achieved by configuring a respective mode of each of the multi-mode antennas.

3. An antenna system for optimizing gain of a repeater, comprising:

a donor antenna sub-system that accepts an incoming signal;

a server antenna sub-system configured to relay an optimized version of the incoming signal;

a processor configured to determine an optimal configuration for the antenna system for generating the optimized version of the incoming signal, the optimal configuration being based on an optimal value of a cost function of operating the donor antenna sub-system and/or the server antenna sub-system in each of one or more operational configurations, the cost function being based on one or more operational inputs;

characterized in that:

the server antenna sub-system comprises a multi-mode antenna adapted for configuration in one of a plurality of possible antenna modes, the multi-mode antenna exhibiting a distinct radiation pattern when configured in each of the antenna modes;

wherein the optimal configuration for the antenna system is achieved by configuring the multi-mode antenna in the one of the plurality of possible modes.

4. The antenna system of claim 3, wherein the donor antenna sub-system comprises a second multi-mode antenna adapted for configuration in one of a plurality of possible second antenna modes, the second multi-mode antenna exhibiting a distinct radiation pattern when configured in each of the second antenna modes; wherein the optimal configuration for the antenna system is achieved by configuring a respective mode of each of the multi-mode antennas.

* * * * *